United States Patent
Arvidson et al.

(10) Patent No.: US 10,123,367 B2
(45) Date of Patent: Nov. 6, 2018

(54) METHODS AND APPARATUSES FOR CONNECTION SETUP IN A WIRELESS COMMUNICATION NETWORK

(71) Applicant: Telefonaktiebolaget LM Ericsson (publ), Stockholm (SE)

(72) Inventors: Pontus Arvidson, Danderyd (SE); Bo Hagerman, Tyresö (SE); Per Skillermark, Årsta (SE); Yi-Pin Eric Wang, Fremont, CA (US); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 14/915,660

(22) PCT Filed: Jan. 22, 2016

(86) PCT No.: PCT/SE2016/050041
§ 371 (c)(1),
(2) Date: Mar. 1, 2016

(87) PCT Pub. No.: WO2016/126186
PCT Pub. Date: Aug. 11, 2016

(65) Prior Publication Data
US 2016/0374123 A1    Dec. 22, 2016

Related U.S. Application Data

(60) Provisional application No. 62/111,965, filed on Feb. 4, 2015.

(51) Int. Cl.
*H04W 4/00*      (2018.01)
*H04J 3/00*      (2006.01)
(Continued)

(52) U.S. Cl.
CPC .............. *H04W 76/11* (2018.02); *H04W 8/005* (2013.01); *H04W 48/12* (2013.01); *H04W 74/08* (2013.01);
(Continued)

(58) Field of Classification Search
CPC . H04W 76/021; H04W 76/046; H04W 48/12; H04W 74/08; H04W 8/005; H04W 84/12; H04W 4/008
See application file for complete search history.

(56) References Cited

U.S. PATENT DOCUMENTS

2012/0052802 A1   3/2012   Kasslin et al.
2012/0327920 A1   12/2012   Xhafa et al.
(Continued)

OTHER PUBLICATIONS

Al Kalaa, M. O., et al., "Bluetooth Standard v4.1: Simulating the Bluetooth Low Energy Data Channel Selection Algorithm", Globecom 2014 Workshop—Telecommunications Standards—From Research to Standards, Dec. 8, 2014, p. 729-733, IEEE, Austin, TX.
(Continued)

*Primary Examiner* — Kiet Tang
(74) *Attorney, Agent, or Firm* — Coats & Bennett, PLLC

(57) ABSTRACT

The present disclosure relates to an advertising device (310) in a wireless communication network. Embodiments include a method implemented by the advertising device (310) comprising transmitting an advertisement message (340) from the advertising device (310) over a first channel (330). An advertisement message (340) advertises that the advertising device (310) is available to connect with one or more other devices in the wireless communication network (300). The method also comprises, after transmitting the advertisement message (340), receiving at the advertising device (310) a connection request message (360) from a requesting device (320) in the wireless communication network (300) over a second channel (350) different than the first channel
(Continued)

(330). A connection request message (360) requests the advertising device to connect with the requesting device. Embodiments also include a requesting device (320) in a wireless communication network and methods implemented by a requesting device (320).

43 Claims, 12 Drawing Sheets

(51) Int. Cl.
| | | |
|---|---|---|
| G08C 17/00 | (2006.01) | |
| H04L 12/26 | (2006.01) | |
| H04B 7/00 | (2006.01) | |
| H04W 76/11 | (2018.01) | |
| H04W 76/27 | (2018.01) | |
| H04W 8/00 | (2009.01) | |
| H04W 48/12 | (2009.01) | |
| H04W 74/08 | (2009.01) | |
| H04W 4/80 | (2018.01) | |
| H04W 84/12 | (2009.01) | |
| H04W 74/00 | (2009.01) | |

(52) U.S. Cl.
CPC ............. *H04W 76/27* (2018.02); *H04W 4/80* (2018.02); *H04W 74/00* (2013.01); *H04W 84/12* (2013.01)

(56) References Cited

U.S. PATENT DOCUMENTS

| | | | |
|---|---|---|---|
| 2013/0010766 A1* | 1/2013 | Sadek | H04W 72/1215 370/336 |
| 2014/0086125 A1* | 3/2014 | Polo | H04W 52/0229 370/311 |
| 2014/0293777 A1* | 10/2014 | Dhillon | H04W 28/0231 370/230 |
| 2014/0378058 A1* | 12/2014 | Decuir | H04W 4/008 455/41.2 |

OTHER PUBLICATIONS

Blue Tooth "Core System Package [Low Energy Controller volume]"; Jun. 30, 2010; pp. 1-136; Specification vol. 6, Specification of the Bluetooth System, covered Core Package version: 4.0; XP55016390A.

3rd Generation Partnership Project "Technical Specification Group Radio Access Network; Evolved Jniversal Terrestrial Radio Access (E-UTRA) and Evolved Universal Terrestrial Radio Access Network (E-UTRAN); Overall description; Stage 2 (Release 12)"; Dec. 2012; pp. 1-251; 3GPP TS 36.300 V12.3.0; Sophis Antipolis, Valbonne, France.

* cited by examiner

PRIOR ART Figure 2

Figure 6
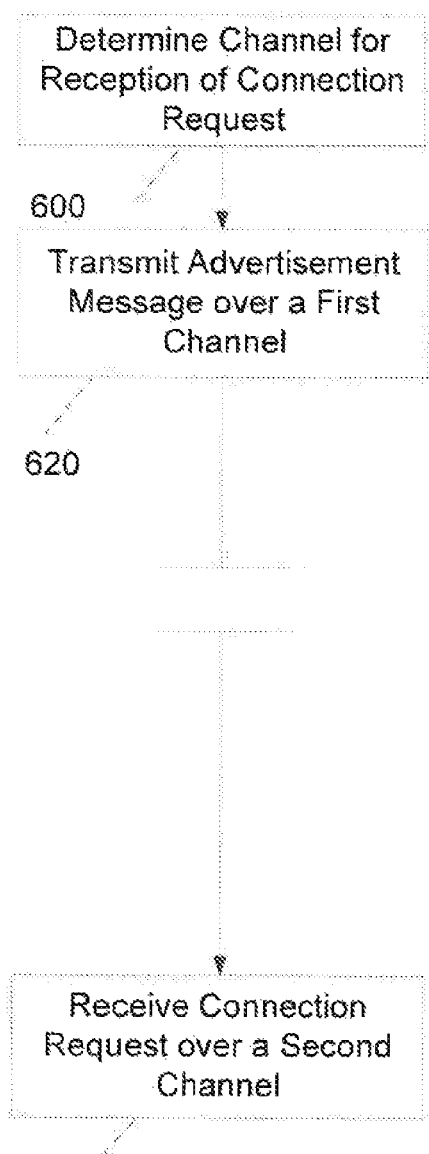
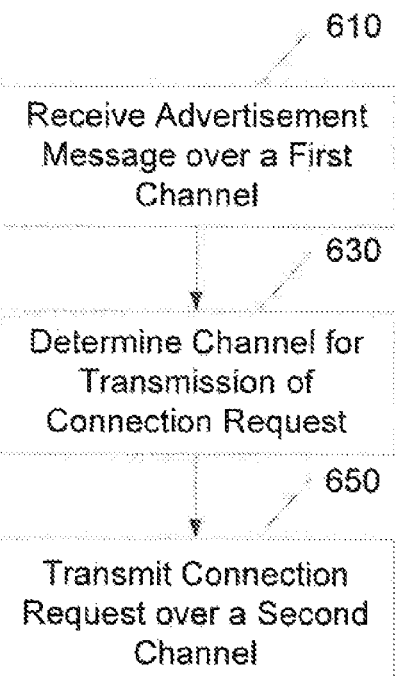

METHODS AND APPARATUSES FOR CONNECTION SETUP IN A WIRELESS COMMUNICATION NETWORK

TECHNICAL FIELD

The present invention relates generally to connection setup procedures in a wireless communication network.

BACKGROUND

Bluetooth is one wireless technology standard for exchanging data between fixed and mobile devices in a wireless communication network (called a Bluetooth network when Bluetooth is employed). A master or central Bluetooth device may communicate with multiple peripheral Bluetooth devices within the Bluetooth network.

In general, the operation of any radio communication network (e.g., in a Bluetooth Low Energy (BLE) network) is limited by at least the following: the signal-to-noise ratio (SNR) of the radio link(s); multiple access interference from other devices in the same network; and/or external interference. For example, BLE operates in the unlicensed 2.4 GHz band (ISM band from 2.4 to 2.485 GHz), in which it must co-exist with various other communication networks, such as WiFi. It may hence be exposed to, and must be able to operate in the presence of, interference from co-existing networks.

Further, advances in BLE technology may increase multiple access interference from other devices within a BLE network. In its current form, one single transmission rate, namely 1 Mbps physical layer bitrate, is supported but work is ongoing to add support for both higher and lower bitrates. The higher bitrate mode is referred to as the 2 Mbps mode, whereas the lower bitrates go under the common name BLE long range (LR), which supports bitrates down to 125 kbps on the physical layer. As the name implies the BLE LR mode extends the transmission range of the BLE communication networks. With support for an increased transmission range, the number of devices participating in a network may grow since, with an increased range, each device may reach out to a larger number of peer devices. In addition, using a lower transmission rate implies that it takes longer time to transmit data over the air.

The BLE link layer specifies that there are 40 channels available for communication. Three of those channels are advertisement channels used, e.g., for broadcasting of data and setting up data connections, and 37 are data channels. The BLE link layer channel map 100 is depicted in FIG. 1. The advertising channels are considered contention-based and the data channels are considered contention-free.

FIG. 2 depicts the current connection setup in BLE. Connection setup in BLE is initiated by a peripheral device connecting to a central device. When such a peripheral device has a need to communicate with the central device, it sends an advertisement message 200 destined to the central device (it may be directed to a single central device or open such that any central device may answer). This advertisement message 200 is transmitted using one of the link layer advertisement channels 270. If the central device receives the advertisement message it will answer with a connection request message 210, which includes connection setup parameters required to start the data exchange. The connection request message is transmitted over the same channel as the advertisement message 200 was received on and a given time after the reception of the advertisement message 200. The peripheral device hence knows at which channel and at what time the answer from the central device, i.e., the connection request, is expected. A typical BLE transaction, including the connection setup procedure, is depicted in FIG. 2. FIG. 2 shows that once the connect request message 210 is sent, the central device also transmits a connection establishment message 220 on a different channel; namely, a so called data channel 280. The peripheral device can then begin transmitting data to the central device on the data channel 280. The peripheral device also informs the central device when the peripheral device wishes to terminate the connection in a termination message 250. The central device acknowledges 250 the receipt of data and acknowledges 260 the termination message. In other situations it may also be the central device that terminates the connection.

A frequency hopping spread spectrum (FHSS) radio transmission process may be used for transmission over the data channels. Under FHSS, the transmission regularly hops between different data channels on different frequencies according to a predetermined code. The receiver of the transmission must also receive on the same frequencies using the same frequency hopping sequence. Thus, if there is for instance channel noise localized to specific frequencies as opposed to spread across the frequencies, the effect of this disturbance on communication is minimized.

The setup procedure is well designed to handle situations in which the network is SNR-limited, and to some extent also the handling of external interference. As the advertisement message had an SNR sufficient for successful reception, it is also reasonable to assume that the answer in the opposite direction has a good chance of being successfully received; the channel is reciprocal and typically similar transmit powers are used. Also, if the reception of the advertisement message was not limited by external interference, it is a decent assumption that the interference situation in the opposite direction is such that also the connection request can be received. Finally, the fact that the two messages are transferred on the same channel implies that the radio hardware does not need to switch frequency, which simplifies the implementation.

SUMMARY

Embodiments herein improve the connection setup procedure in a wireless communication network, such as a Bluetooth Low Energy network. One or more embodiments, for example, transmit an advertisement message and a connection request message over different channels or transmission resources. Thus, the setup procedure in some embodiments is better equipped to handle an environment where a network includes many devices seeking respective connections.

Some embodiments include a method implemented by an advertising device in a wireless communication network. The method comprises transmitting an advertisement message from the advertising device over a first channel. An advertisement message as used herein advertises that the advertising device is available to connect with one or more other devices in the wireless communication network. The method also comprises, after transmitting the advertisement message, receiving at the advertising device a connection request message from a requesting device in the wireless communication network over a second channel different than the first channel. A connection request message as used herein requests the advertising device to connect with the requesting device.

In one or more embodiments, the method further comprises dynamically selecting the second channel, from among multiple different candidate channels, as being the channel over which a connection request message is to be received. In one embodiment, this dynamic selection is based on measurements or estimates of interference on the different candidate channels. Regardless, the method also comprises transmitting information from the advertising device indicating that selection. In one embodiment, this information is transmitted within the advertisement message itself.

In one or more embodiments, the method comprises receiving the connection request message over the second channel if a previous transmission of the connection request message is not received over the first channel and/or not successfully acknowledged to the requesting device.

In one or more embodiments, the method further comprises dynamically selecting, from among multiple different candidate channels including the first channel and the second channel, a channel over which the connection request message is to be received. In this case, the advertising device may receive the connection request message over the second channel when the second channel is dynamically selected and receive the connection request message over the first channel when the first channel is dynamically selected.

Embodiments herein also include a method implemented by a requesting device for requesting an advertising device to connect to the requesting device in a wireless communication network. The method comprises receiving, at the requesting device, an advertisement message from the advertising device over a first channel. The advertisement message advertises that the advertising device is available to connect with one or more other devices in the wireless communication network. The method also comprises, responsive to the advertising message, transmitting a connection request message from the requesting device to the advertising device over a second channel different than the first channel. The connection request message requests the advertising device to connect with the requesting device.

The method by the requesting device in some embodiments comprises receiving information from the advertising device indicating the advertising device's dynamic selection of the second channel as being the channel over which connection request messages responsive to the advertisement message are to be received. In one embodiment, for example, this entails retrieving the information from within the advertisement message.

In one or more embodiments, the method by the requesting device further comprises, before transmitting the connection request message over the second channel, transmitting the connection request message over the first channel and monitoring for an acknowledgement of the connection request message from the advertising device. In this case, transmitting the connection request message over the second channel comprises re-transmitting the connection request message over the second channel if according to said monitoring the advertising device does not acknowledge the connection request message as transmitted over the first channel.

In some embodiments, the method may entail transmitting the connection request message over the second channel responsive to determining that the second channel was dynamically selected by the advertising device as being the channel over which the connection request message is to be transmitted. In other embodiments, the method entails transmitting the connection request message over the first channel responsive to determining that the first channel was dynamically selected by the advertising device as being the channel over which the connection request message is to be transmitted.

In any of these methods, the first channel may be a contention-based channel with respect to any other advertisement messages transmitted during the transmission of the advertisement message, and the second channel minimizes contention from any advertisement messages transmitted during the transmission of the connection-request message. Alternatively or additionally, the first channel is of an advertising type and the second channel is of a data type. Alternatively or additionally, the first channel may be a random access channel and the second channel may be a scheduled channel (e.g., a dedicated scheduled channel).

Any of these methods may comprise identifying the second channel as being the channel over which the connection request message is to be transmitted, based on a defined mapping from the first channel to the second channel. Such mapping may map different candidate advertisement channels to different candidate connection request channels with a one-to-one or one-to-many correspondence. For example, such mapping may map any given candidate advertisement channel to the candidate connection request channel that has the minimum frequency distance from the given candidate advertisement channel.

Any of these methods may further comprise configuring the second channel as being the channel over which the connection request message is to be received, via radio resource control signaling.

In any of these methods, the advertisement message may comprise configuration information indicating the second channel.

Any of these methods may further comprise, during a previous connection between the advertising and requesting devices, configuring the second channel as being the channel over which the connection request message is to be received.

In any of these methods, the connection request message may include connection setup parameters for data exchange between the advertising and requesting devices.

In any of these methods, the wireless communication network may be one of a personal area network, a local area network, or a Bluetooth network.

In any of these methods, the wireless communication network may be a Bluetooth Low Energy network supporting a long range physical layer.

In any of these methods, the advertising device may be a peripheral device and the requesting device may be a central device.

Embodiments herein also include corresponding apparatus, computer programs, and carriers containing such computer programs.

In one particular embodiment, the advertisement message is transmitted over a contention-based channel (e.g., with respect to any other advertisement messages transmitted during the transmission of an advertisement message), but a connection request message is transmitted over a channel considered to be contention-free (e.g., the channel minimizes contention from any advertisement messages transmitted during the transmission of a connection-request message), rather than over the contention-based channel. Such embodiments mitigate one or more problems associated with the connection request being transmitted on a contention-based channel, such as multiple access interference from other devices transmitting in the same network. The embodiments do so by introducing a means for connection setup on a dedicated, contention-free, channel. In a preferred embodiment, the connection request channel is selected as a function of which channel is used for the advertisement message.

BRIEF DESCRIPTION OF THE DRAWINGS

FIG. 6 illustrates methods implemented by an advertising device and a requesting device according to one or more embodiments.

DETAILED DESCRIPTION

Figure 3:
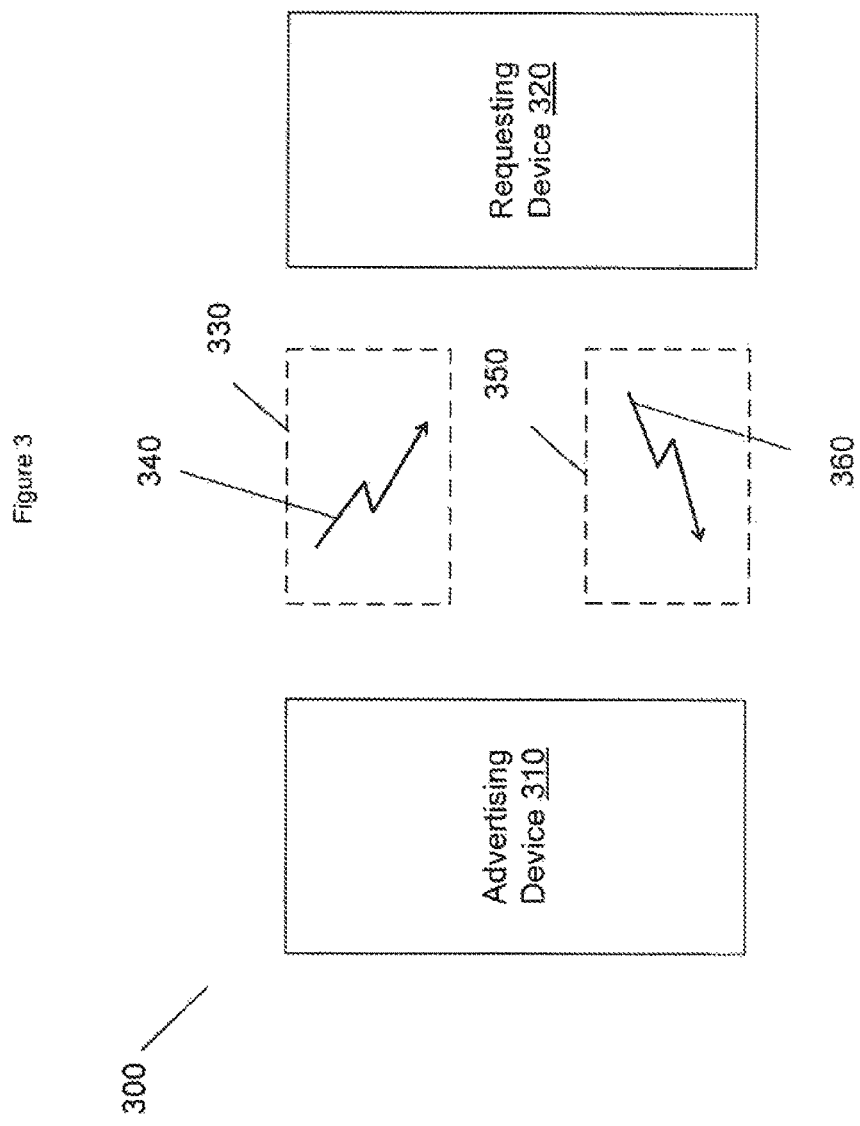
FIG. 3 illustrates a diagram of signaling between an advertising device and a requesting device according to one or more embodiments.

FIG. 3 illustrates a wireless communication network 300 (e.g., a Bluetooth Low Energy, BLE, network) according to one or more embodiments. The network 300 includes an advertising device 310 (e.g., a peripheral device in a BLE network) and a requesting device 320 (e.g., a central device in a BLE network). The advertising device 310 and requesting device 320 are in the same wireless communication network 300 in that the devices can wirelessly communicate with one another.

The advertising device 310 and requesting device 320 wirelessly communicate over multiple different channels. These channels include a first channel 330 (e.g., broadly referred to herein as the advertisement channel) and a second channel 350 (e.g., broadly referred to herein as a request channel). In one or more embodiments, the request channel is different from the advertisement channel in the sense that it is a different type of channel. In some embodiments, for example, the advertisement channel is a random access channel, and the request channel is a scheduled channel (e.g., a dedicated scheduled channel). In the same embodiment or a different embodiment, the advertisement channel is considered a contention-based channel, whereas the request channel is considered a contention-free channel in the wireless communication network 300. In the same or different embodiments, the advertisement channel is a channel that can be used for control signaling (e.g., an advertisement channel in BLE), whereas the request channel is a data channel (e.g., a data channel in BLE).

Figure 4:
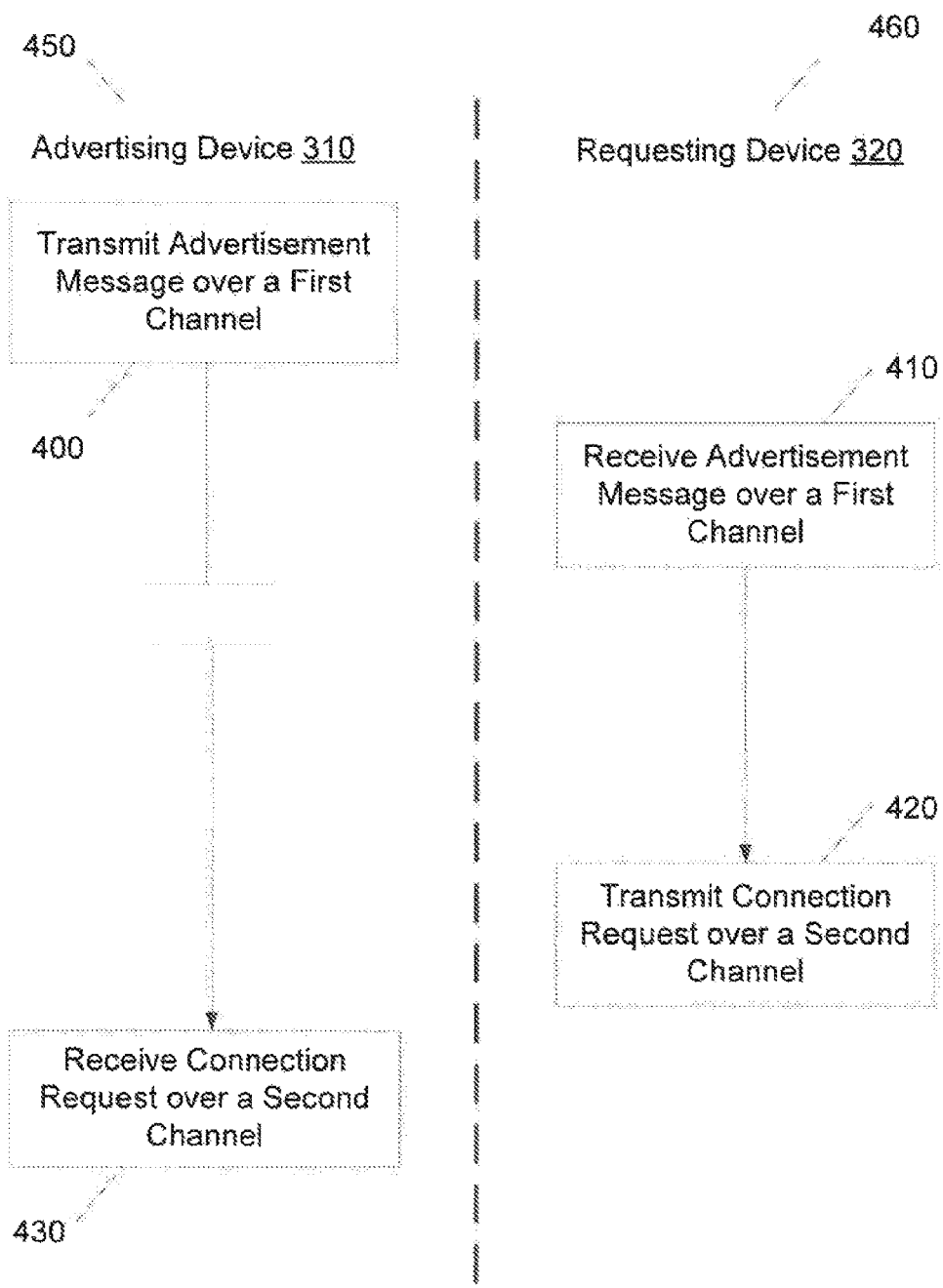
FIG. 4 illustrates methods implemented by an advertising device and a requesting device according to one or more embodiments.

Within this context, FIG. 4 illustrates a method 450 implemented by the advertising device 310 and a method 460 implemented by the requesting device 320 for connecting to one another, according to one or more embodiments. As shown, the advertising device 310 transmits an advertisement message 340 over the first channel 330 (Block 400). The advertisement message 340 advertises that the advertising device 310 is available to connect with one or more devices in the wireless communication network 300. The advertisement message 340 in this regard may advertise exclusively to a particular device (based on having previously connected to that device) or non-exclusively to any device. Regardless, the method 460 implemented by the requesting device 320 correspondingly includes receiving the advertisement message 340 over the first channel 330 (Block 410).

Responsive to the advertising message 340, the requesting device 320 transmits a connection request (CR) message 360 to the advertising device 310 (Block 420). The CR message 360 requests the advertising device 310 to connect with the requesting device 320 in response to the advertisement message 340. The CR message 360 may for instance include information indicating setup parameters for data exchange between the devices. In any event, the CR message 360 is notably transmitted over a second channel 350 that is different than the first channel 330. Correspondingly from the perspective of the advertising device 310, after transmitting the advertisement message 340, the advertising device 310 receives the CR message 360 from the requesting device 320 over the second channel 350 (Block 430).

In some embodiments, receiving the CR message 360 over a different channel than the channel over which the advertisement message 340 is transmitted advantageously minimizes interference to the CR message 360 from other devices. Consider for instance embodiments where the first channel 330 is a random access channel, and the second channel 350 is a scheduled channel. If the requesting device 320 were to transmit the CR message 360 over the first channel 330, it would be susceptible to contention from any advertisement messages also transmitted over that first channel 330 to the requesting device 320. Accordingly, the requesting device 320 herein instead schedules the CR message 360 for transmission over the second channel 350, such that the CR message 360 is free from the contention it would have otherwise experienced had it been transmitted over the first channel 330.

Figure 5:
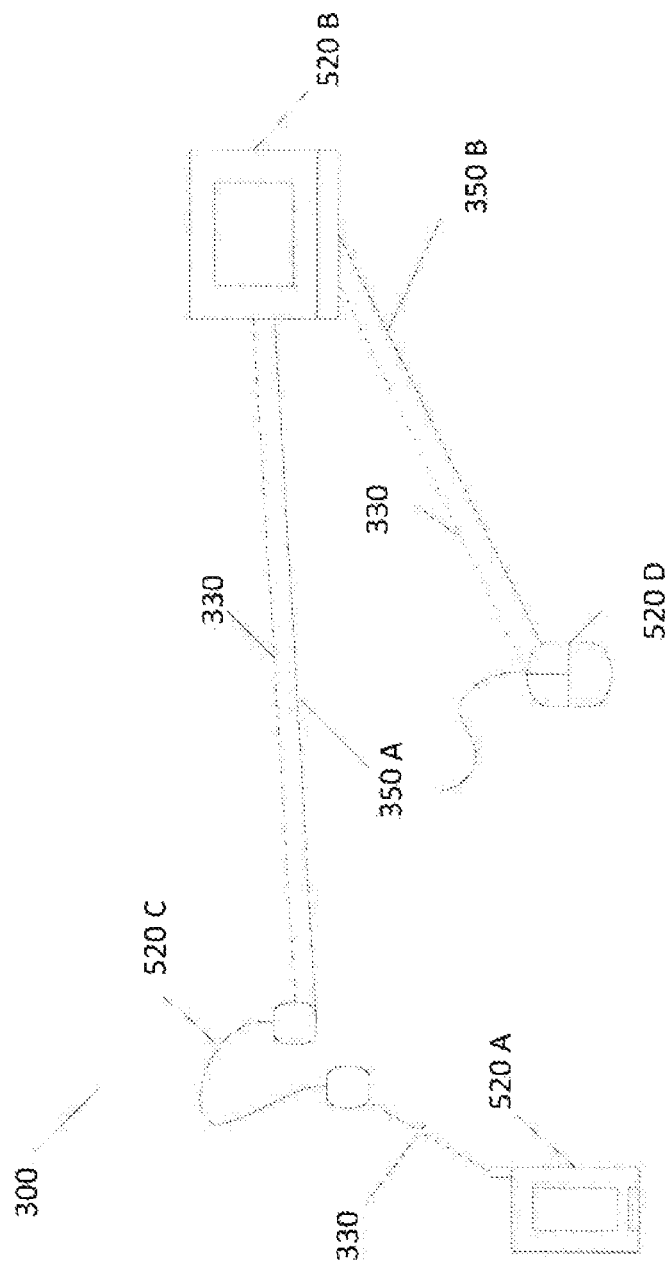
FIG. 5 illustrates a wireless communication network with advertising devices and requesting devices according to one or more embodiments.

FIG. 5 illustrates an example in this regard. As shown, the wireless communication network in FIG. 5 includes a mobile device 520A, computer 520B, an output device 520C and an input device 520D. As an advertising device, output device 520C sends an advertisement message 340 over an advertisement channel 330. The advertisement message 340 may be exclusive (e.g. output device 520C advertises specifically for and targeted to computer 520B) or non-exclusive (e.g., output device 520C sends an advertisement message to devices in range including computer 520B and mobile device 520A. Regardless, in sending the advertisement message 340, the output device 520C may contend with input device 520D. For example, there may be contention on the advertisement channel 330 if the advertisement channel 330 is a random access channel and output device 520C and input device 520D both access the channel at the same time. Input device 520D in some embodiments sends out its own messages (e.g., an advertisement message described herein) on the advertisement channel 330, which may interfere with a given message from output device 520C on the same channel. In this embodiment then advertisement channel 330 is also a contention-based channel with respect to any other advertisement messages transmitted (e.g., from input device 520D) during the transmission of the advertisement message 340.

Responsive to receiving the advertisement message 340 over the advertisement channel 330, computer 520B transmits a connection request (CR) message 360. Computer 520B minimizes interference to this CR message 360 (e.g. from messages transmitted by input device 520D on advertisement channel 330) by transmitting the CR message 360 over a different channel; namely, request channel 350A.

In this embodiment, the request channel 350A, in contrast to the advertisement channel 330, is a contention-free channel with respect to certain types of contention. For example, the request channel 350A minimizes contention from any advertisement messages transmitted from a device within the same wireless communication network (e.g., the same BLE network). As shown in FIG. 5, for instance, the request channel 350A minimizes contention from input device 520D transmitting on channel 330 during the transmission of the CR message 360. In some embodiments, the request channel is not contention-free with respect to all types of possible contention (e.g., contention from any advertisement messages transmitted from a device within a different wireless communication network, such as a different BLE network, or from a device within an external network). For example, a device transmitting a CR message 360 may experience interference caused by external interference (e.g., signaling in another network like a WiFi network). Further, if the advertisement message 340 is transmitted non-exclusively, other receiving devices (e.g. mobile device 520A) may respond on the second channel as well. Regardless, transmitting on an alternate channel in some embodiments advantageously minimizes possible contention. Other procedures may be employed to reduce other types of contention (e.g., using existing back-off procedures).

In some embodiments, the request channel is a scheduled channel, e.g., in the frequency domain and/or the time domain. For example, a CR message 360 may be scheduled for transmission on a specific frequency. In some embodiments, this scheduling is performed only in the frequency domain, not in the time domain. Indeed, the CR message 360 may be transmitted at a fixed or predetermined time (e.g., a fixed time from reception of the advertisement message 340). In additional or alternative embodiments, though, the scheduling is performed only in the time domain. For example, the CR message 360 may be scheduled with respect to the time that the CR message 360 is transmitted. In this case, the computer 520B schedules the CR message to be transmitted at a time when no other messages are being transmitted on that channel (at least to the knowledge of computer 520B). In still other embodiments, the scheduling is performed in both the frequency domain and the time domain.

Regardless of the particular nature of the scheduled channel, computer 520B in the example of FIG. 5 wishes to send a CR message to both input device 520D and 520C. The computer 520B in some embodiments uses a scheduled request channel 350A for the transmission of a CR message 360 to minimize interference with a CR message transmitted on request channel 350B to input device 520D. In some embodiments, the scheduled channel is a dedicated scheduled channel. For example, request channel 350A is a different channel than request channel 350B.

In some embodiments, the request channel 350 is predefined as the sole channel over which any CR message from any device in the network is to be received. The request channel 350 may be defined absolutely, or may instead be defined relative to another channel, e.g., as a channel a certain frequency distance away from the advertisement channel. In other embodiments, the request channel 350 is one of multiple candidate request channels over which CR messages may be received in the network. In this case, a CR message may be received over different ones of the candidate request channels under different circumstances or conditions, e.g., as specified by one or more defined rules at some or all of the devices in the network.

In one embodiment, for example, the advertising device 310 may receive a CR message 360 over a certain one of the candidate request channels depending on which one of multiple different advertisement channels the advertising device transmitted the advertisement message 340. In this case, a defined mapping at the advertising device 310 may map different advertisement channels to different candidate request channels with a one-to-one (or, alternatively, a one-to-many) correspondence. This mapping may be embodied as a function or as a look-up-table, and may be predefined or dynamic. Where the mapping specifies one advertisement channel to many candidate request channels, the requesting device selects on which of these subset of candidate request channels to transmit the connection request message.

Regardless of the particular mapping chosen, the advertising device 310 identifies which one or a subset of the candidate request channels it is to monitor for a CR message, based on over which one of the candidate advertisement channels it has transmitted or will transmit the advertisement message 340. In at least some embodiments, this mapping maps an advertisement channel to whichever one of the request channels has the smallest minimum frequency distance from that advertisement channel.

Especially in embodiments where the request channel 350 is predefined or otherwise deterministic based on the channel over which the advertisement message is transmitted/received, the point in time at which the advertising device 310 and the requesting device 320 identify the request channel 350 is inconsequential. The devices 310, 320 may for instance simply identify the request channel 350 at some point prior to transmitting or receiving the connection request over that channel.

In other embodiments, by contrast, the advertising device 310 identifies or otherwise determines the request channel prior to transmitting the advertisement message. In at least some embodiments, the advertising device 310 correspondingly signals the identity of the request channel to the requesting device 320, e.g., within the advertisement message.

As shown in FIG. 6, for example, the advertising device 310 determines the request channel 350 (Block 600) prior to transmitting the advertisement message (Block 620). And the requesting device 320 310 determines the request channel (Block 630) prior to transmitting the connection request (Block 640).

In some embodiments, for example, the advertising device 310 may receive a CR message 360 over a candidate request channel of its choosing, after dynamically selecting that channel and signaling its selection to the requesting device 320, e.g., within the advertisement message 340. This selection may be based, for instance, on the advertising device's assessment of the potential interference on the different candidate request channels, so as to select the channel with the least interference.

Figure 7:
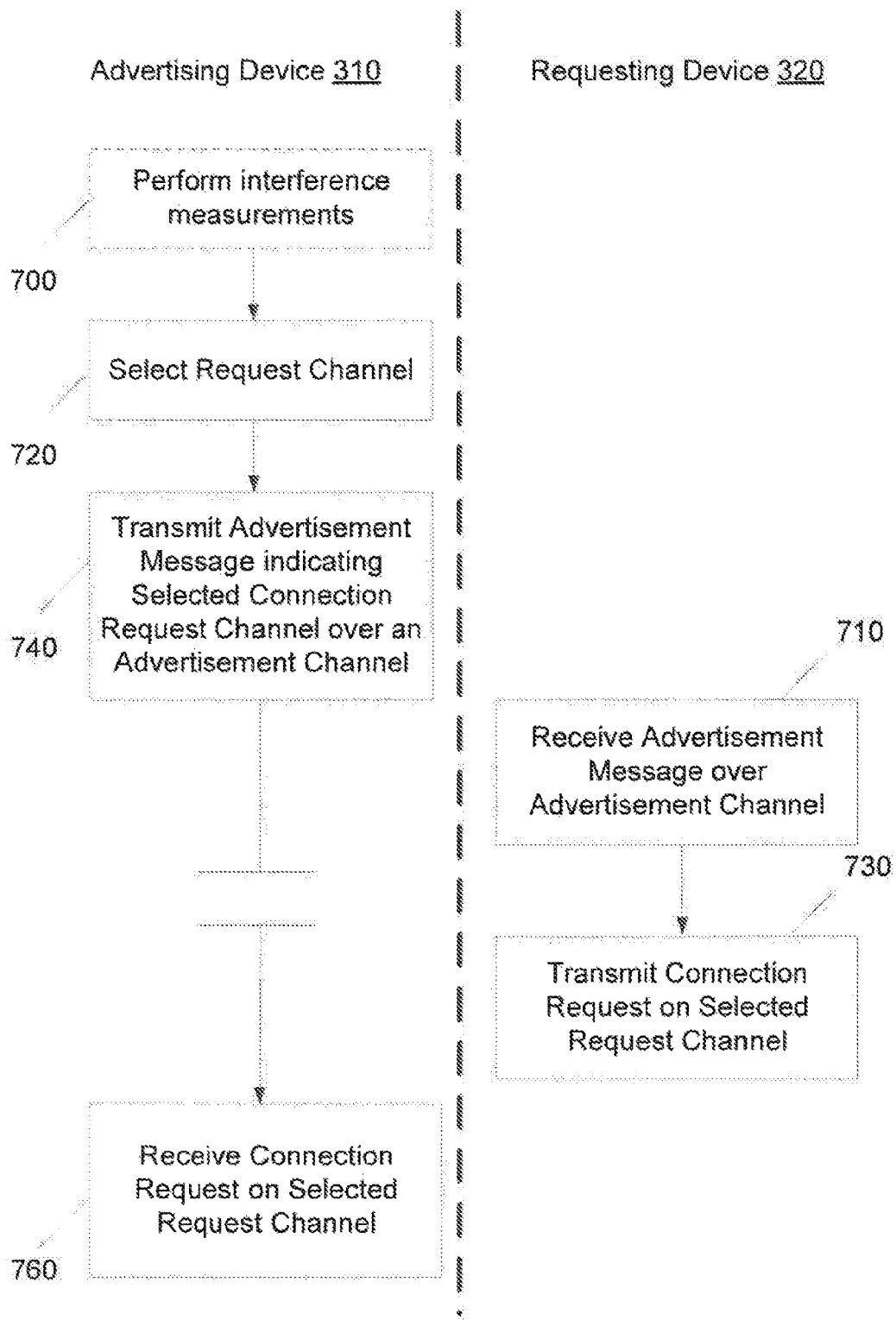
FIG. 7 illustrates methods implemented by an advertising device and a requesting device according to one or more embodiments.

FIG. 7 shows a more detailed method according to one or more embodiments in this regard. The advertising device may optionally perform interference measurements (Block 700) prior to selecting the request channel (Block 720). In this case, the advertising device 310 may select a channel with low interference for the connection request channel 350. Regardless of the criteria used to select the request channel, though, the advertising device 310 transmits the advertisement message 340 over the advertisement channel 330 (Block 740). After receiving the advertisement message 340 over the advertisement channel 330 (Block 710), the requesting device 320 identifies the selected request channel based on information retrieved from within the advertisement message 340 indicating that channel. The requesting device 320 then transmits the connection request message 360 on the identified request channel 350 (Block 730), whereupon that message 360 is received by the advertising device 310.

As an alternative to the above, the requesting device 320 in some embodiments receives a separate message indicating the request channel 350. For example, the separate message is associated with the advertisement message or is received in a previous message such as in a preceding connection between the devices.

Various approaches may be used in one or more embodiments described above for determining or selecting a request channel over which to transmit or receive a CR message 360 in a wireless communication network 300. In some embodiments, receiving the CR message 360 in turn improves the performance of a wireless communication network 300, such as a Bluetooth Low Energy network, especially at high traffic loads. This also enhances the capacity of the network, and it results in shorter packet delays and increased battery lifetime (for battery powered devices).

Those skilled in the art will understand that the teachings herein may apply to many types of wireless communication networks 300 as explained. Wireless communication networks 300 according to some embodiments herein include a personal area network, a local area network, a Bluetooth network, or a Bluetooth Low Energy network. Some embodiments include ad-hoc type of wireless communication networks 300 in which there is no relation or association between the advertising device 310 and requesting device 320 before an initial message exchange (e.g., an advertising message 340 and connection request message 360). Thus, the advertising device 310 and requesting device 320 become part of a wireless communication network 300 in some embodiments by exchanging an advertising message 340 and connection request 360.

Bluetooth Low Energy network is one example of a wireless communication network in which current embodiments may apply. Embodiments herein improve the connection setup procedure in a wireless communication network 300, such as a Bluetooth Low Energy network. Under the current setup procedure for Bluetooth Low Energy networks, a connection request message is exposed to interference on the contention-based advertisement channel. That is, a connection request message may be interfered by advertisement messages transmitted by nearby BLE devices, which try to establish a connection with a central device in the same or another BLE network. This problem is accentuated in a network with many devices and in situations in which the device traffic intensity is high. In short, to transmit the connection request message on a contention-based channel is not good from a performance perspective.

Further, due to the length of the connection request (CR) transmission, it is more susceptible to a collision than a regular advertising message. In addition, a missed CR message results in a state mismatch (e.g., a central device cannot set up a new connection with a peripheral device). A state mismatch can be resolved by means of a timeout. Hence, a CR is a vulnerable message and a message for which a failed reception gets the largest consequences (e.g., waiting for a timeout).

With an understanding that a Bluetooth network is just one example of a wireless communication network in which embodiments herein may apply, various embodiments below will be described in the context of these specific examples. For example, the advertisement device may be a peripheral device and the requesting device is a central device.

In some embodiments, a preconfigured or standardized channel for transmitting or receiving the connection request message is used. In its simplest form one single BLE channel could be used for this purpose.

In one or more embodiments, there exists a mapping between the advertisement channel(s) and the connection request channel(s). For example, such a mapping may be embodied as a function, such that the device(s) determine the connection request channel as a function of the channel on which the advertisement message was transmitted or received. Additionally or alternatively the mapping may be stored in a look-up table at one or more of the devices in the wireless communication network.

Figure 1:
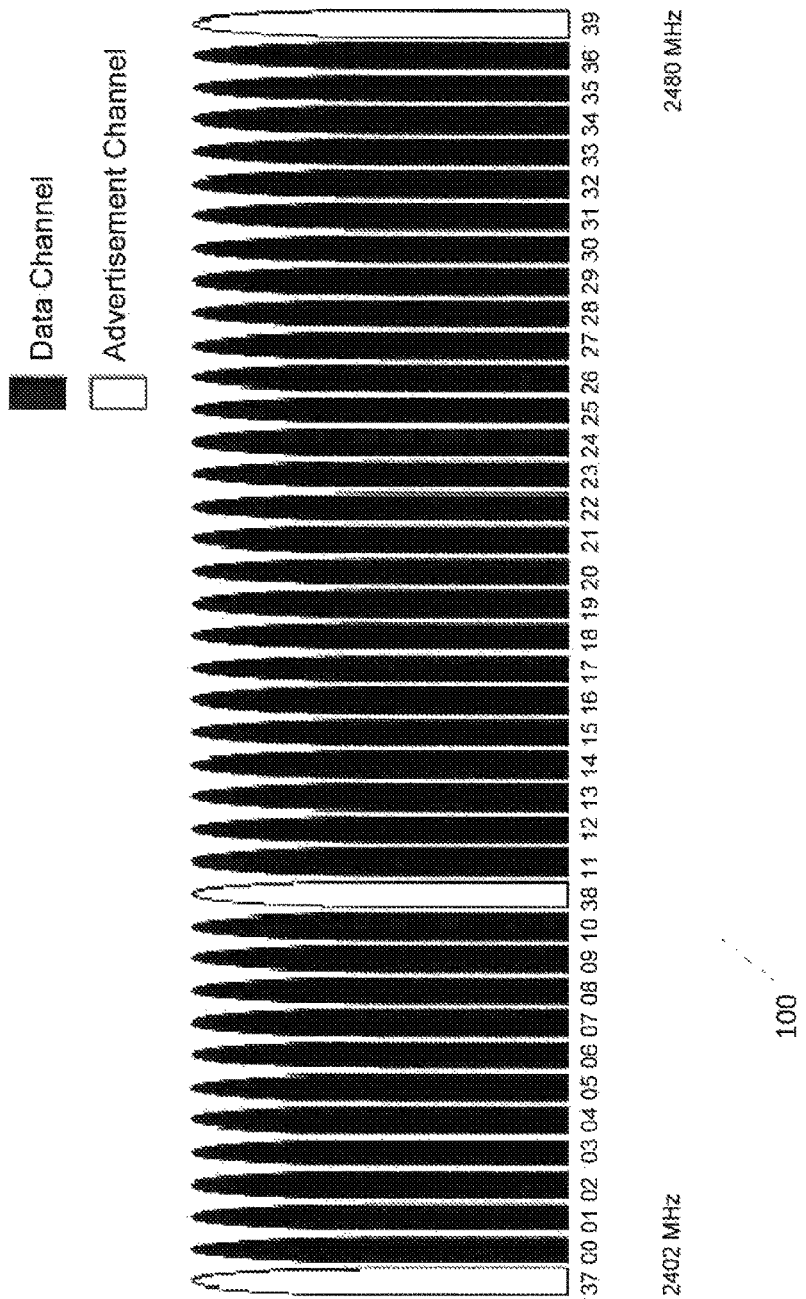
FIG. 1 illustrates a block diagram of data channels and advertisement channels available for communication in a BLE network.
Figure 2:
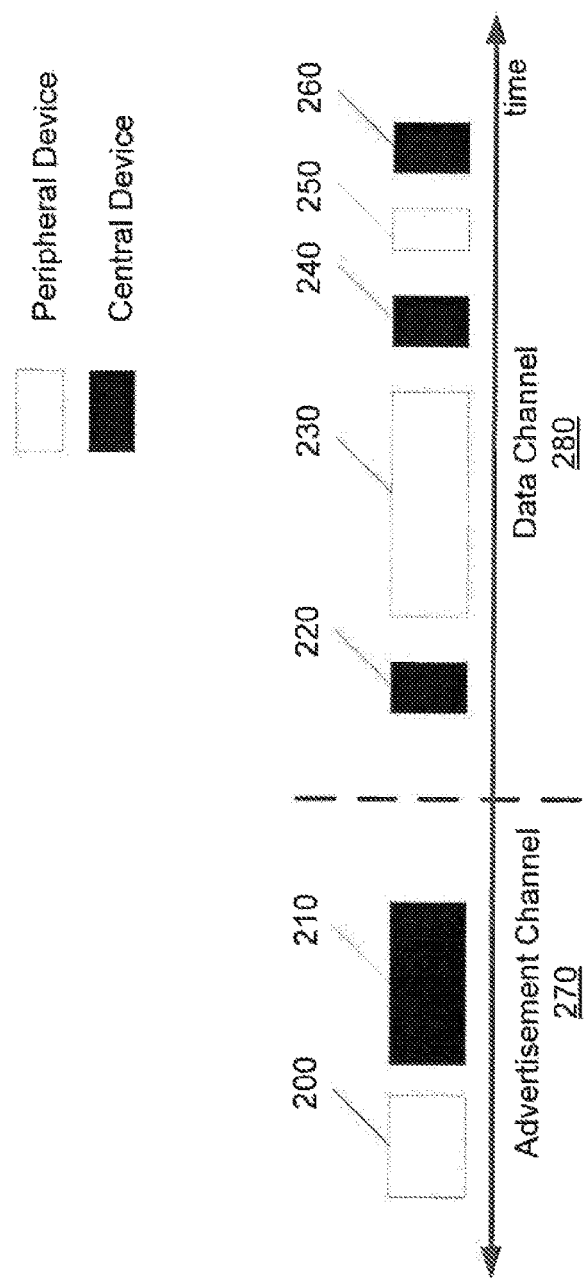
FIG. 2 illustrates a time diagram of signaling to set up a BLE connection between a peripheral and central device in a BLE network.
Figure 8:
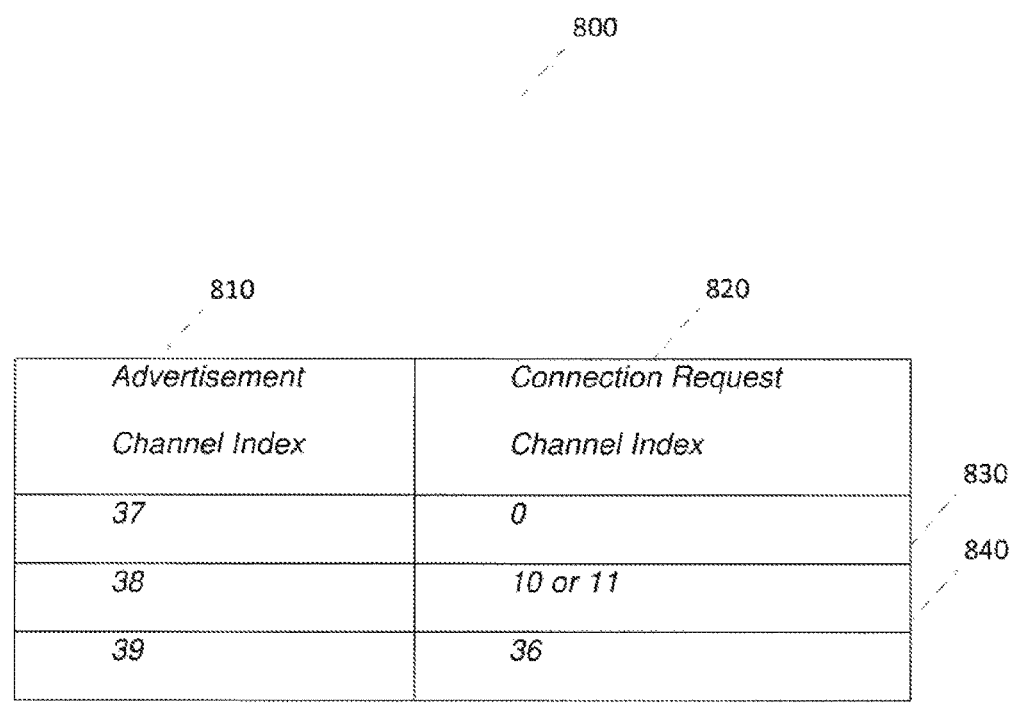
FIG. 8 illustrates a mapping of advertisement channels to connection request channels according to one or more embodiments.

FIG. 8 in this regard shows an example mapping 800 in the context of a BLE network. In BLE, a link layer channel map 100, as shown in FIG. 1, indexes various channels corresponding to a specific frequency range. In an example embodiment, for each advertisement channel, an advertisement channel index 810 corresponding to an index in a link layer channel map 100 is mapped to a connection request channel index 820 corresponding to a specific index in a link layer channel map 100.

To limit the impact of frequency selective fading and SNR variations, and to maintain robustness to external interference, it is preferred to map the connection request message on to a channel which is close in frequency to the channel of the advertisement message. FIG. 8 shows such a possible mapping function in the context of BLE in this regard.

FIG. 8 shows a one-to-one mapping 830 and a one-to-many mapping 840. Alternatively, since channel 38 has two channels near in frequency to the advertisement channel, the connection request channel index 820 could have specified 10 or 11 as a one-to-one mapping.

Alternatively, as alluded to above, the advertising device 310 may select the connection request channel, e.g., based on different criteria. This information can be contained within the advertisement message itself, in a separate message associated with the advertisement message, or in a previous message such as in a preceding connection between the devices.

In various embodiments, a wireless communication network 300 includes many different devices with different capabilities. In this case, simple devices may not have the capability to switch channels sufficiently fast and may therefore prefer to receive the connection request on the same channel as the advertisement message was transmitted on. More advanced devices however may perform measurement and select the connection request channel based on the experienced interference situation. In such a case a channel with low interference may be selected for the connection request channel. One example of this may be that no interference is measured on the advertising channel 330 and/or the risk of contention is otherwise assessed to be low it may be advantageous for the transceivers to avoid switching channels between transmitter and receiver.

These preferences or interference situations may lead a given advertising device 310 to dynamically select, from among multiple different candidate channels including the first channel and the second channel, a channel over which the connection request message is to be received. The advertising device 310 thereby receives the connection request message over the second channel when the second channel is dynamically selected and receives the connection request message over the first channel when the first channel is dynamically selected.

That is, in some circumstances, the advertising device 310 may prefer to receive a connection request message on the same channel as the advertisement message was transmitted on. In one or more embodiments, the advertising device 310 transmits an advertisement message over a selected channel indicating that the advertising device has selected the selected channel to receive a connect request message from a requesting device 320 in the wireless communication network 300. After transmitting this advertisement message, the advertisement device 310 receives a connection request message from a requesting device in the wireless communication network over the selected channel.

Figure 9:
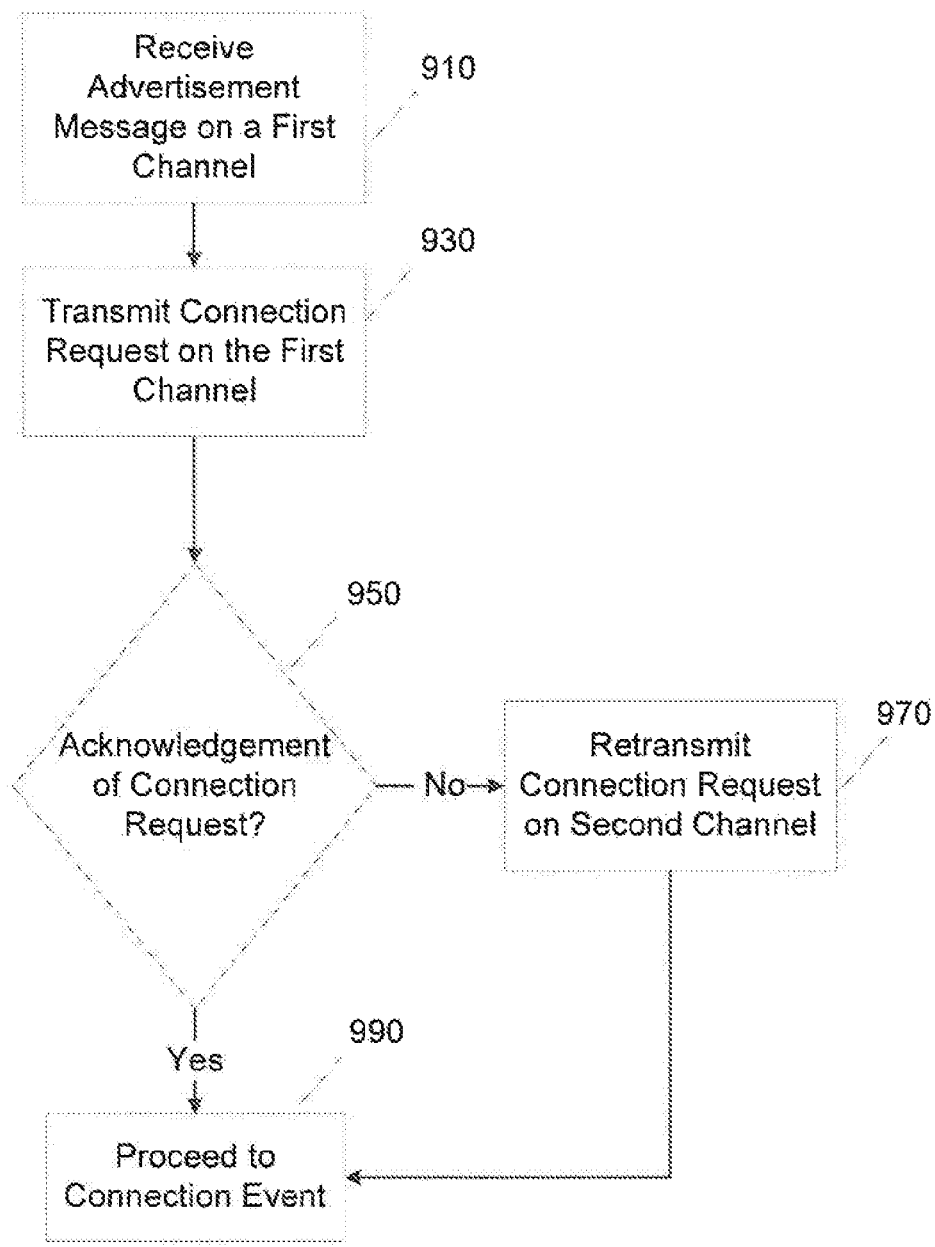
FIG. 9 illustrates a method implemented by a requesting device according to one or more embodiments.
Figure 10:
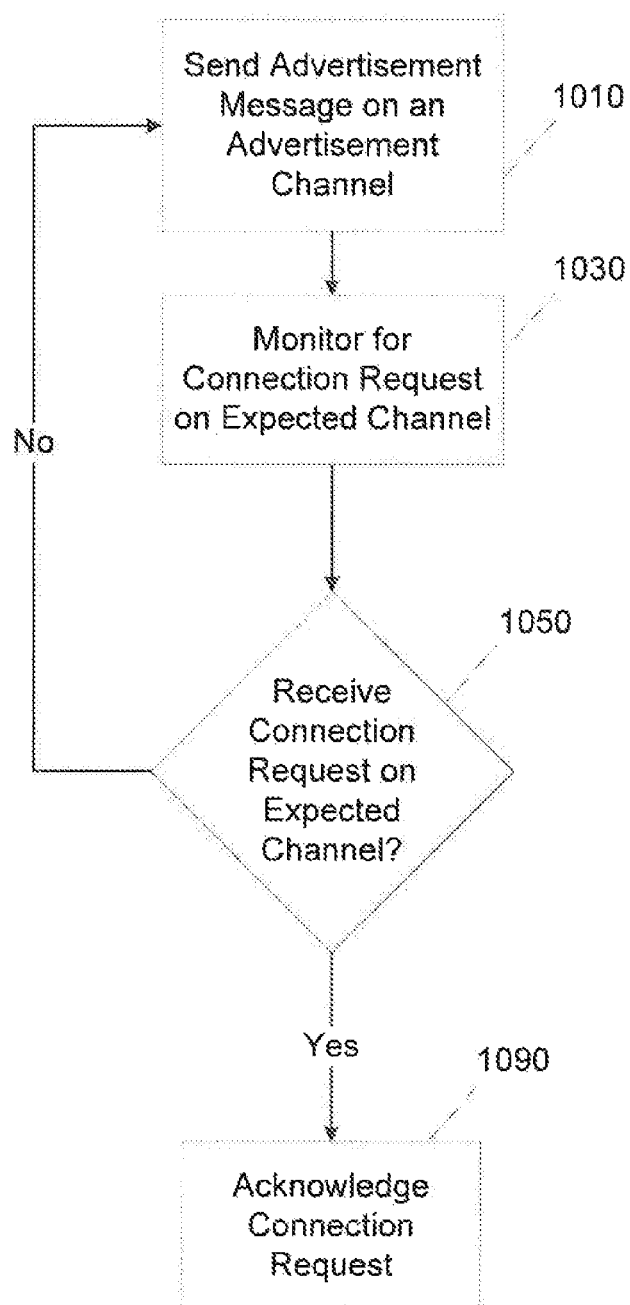
FIG. 10 illustrates a method implemented by an advertising device according to one or more embodiments.

One or more embodiments may provide advantages with advertising devices of different capabilities. One or more embodiments introduce an acknowledgement for the connection request message 360 and the possibility to re-transmit the connection request message 360 on a different channel (e.g., a dedicated resource). For example, the advertising device 310 transmits an acknowledgement when the connection request message 360 is received over the advertisement channel 330. If such an acknowledgement is not received by the requesting device 320, the advertising device re-transmits the connection request message on a different channel than the advertising channel (e.g., on a dedicated resource). FIGS. 9 and 10 show various embodiments in this regard.

FIG. 9 provides a flow-chart of an example method implemented by a requesting device 320. The requesting device 320 receives an advertisement message 340 (Block 910) on a first channel and transmits a connection request 360 on the same channel (e.g., the advertisement channel 330) (Block 930). The requesting device 320 waits for an acknowledgment (950). If no acknowledgement is received, the requesting device 320 retransmits the connection request 360 on a second channel (e.g., the request channel 350) (Block 970). If an acknowledgement is received or the requesting device 320 retransmits, the requesting device then proceeds to a connection event (Block 990). A connection event involves, for example, transmitting additional connection-related data on the request channel or signaling to the advertising device to connect on an alternative channel.

In one or more embodiments, an advertising device 310 receives the connection request message over a request channel if a previous transmission of the connection request message is not received over the advertisement channel and/or not successfully acknowledged to the requesting device 320.

One or more embodiments may use timers, or other known methods, for determining when a device should have acknowledged a CR message, and thus the CR message should be signaled on an alternative channel. For example, a requesting device may retransmit a connection request on an alternative channel in response to receiving a duplicate advertisement message and/or the expiration of a timer for a time period when the CR message should have been acknowledged (Block 970).

FIG. 10 provides a flow chart of an example corresponding method implemented by an advertising device 310 in this regard. The advertising device 310 transmits an advertisement message 340 on an advertisement channel 330 (Block 1010). The advertising device 310 monitors for a connection request on an expected channel (Block 1030). The expected channel may be the advertisement channel 330 or an alternative channel 350 determined by any of the above methods. If the advertising device has not received a connection request (1050) by, for example the expiration of a timer, the advertising device 310 may retransmit the advertisement message on the expected channel and/or another channel. Additionally or alternatively the advertising device 310 monitors for a connection request on an another channel which then becomes the expected channel. For example, if the advertising device 310 expected to receive the CR message on the advertisement channel 330, it may monitor for the connection request on the request channel 350. If the advertising device 310 expected to receive the CR message on the request channel 350, it may monitor for the connection request on the advertisement channel 330. Once, a connection request is received, the advertising device sends an acknowledgment of the connection request (1090).

In one or more embodiments, the particular connection setup procedure may also be configured by means of higher layer signaling (e.g., radio resource control signaling). In such a case, the configuration takes place during a preceding connection and decides how devices shall act in succeeding connection setups. This may then be made as a function of the load in the network. For example, in the context of a BLE network, a central device associated with only a few peripheral devices may choose to use the default setup procedure, whereas a central device associated with many peripheral devices uses one of the above procedure, which are designed to work well at higher traffic loads.

Embodiments also include corresponding apparatus. Embodiments for instance include an advertising device 310 in a wireless communication network 300. The advertising device 310 is configured, e.g., via any functional means or units, to implement the processing described above. The advertising device 310 may include for instance a transmitting means or unit for transmitting the advertisement message 340 and a receiving means or unit for receiving the connection request message 360.

Embodiments also include a requesting device 320 in a wireless communication network 300. The requesting device 320 is configured, e.g., via any functional means or units, to implement the processing described above. The requesting device may include for instance a receiving means or unit for receiving the advertisement message 340 and a transmitting means or unit for transmitting the connection request message.

In at least some embodiments, an advertising device or requesting device comprises one or more processing circuits configured to implement the above processing, such as by implementing corresponding functional means or units. In one embodiments, for example, the device's processing circuit(s) implement functional means or units as respective circuits. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more for carrying out the one or more microprocessors, carries out the techniques described herein.

Figure 11:
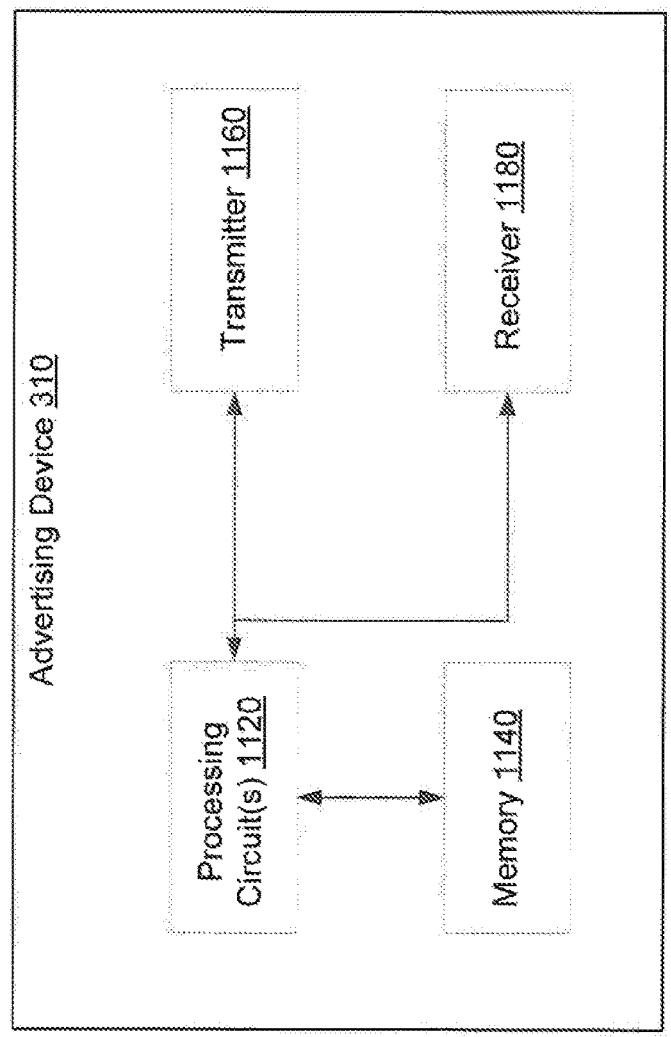
FIG. 11 illustrates a block diagram of an advertising device according to one or more embodiments.

FIG. 11 shows a block diagram of components of an advertising device 310 according to at least some embodiments. As shown in FIG. 11, the device includes one or more processing circuits 1120, memory 1140, transmitter circuits 1160 and receiver circuits 1180. The one or more processing circuits control the operation of the device to perform functionality described above, e.g., via the transmitter and receiver circuits.

Figure 12:
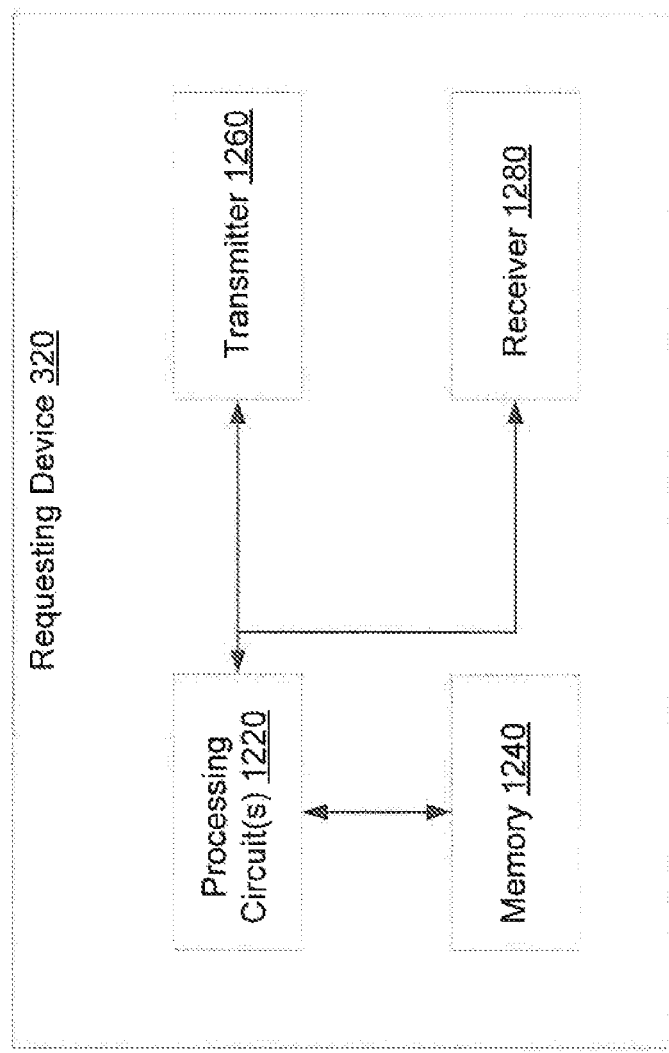
FIG. 12 illustrates a block diagram of a requesting device according to one or more embodiments.

FIG. 12 shows a block diagram of components of a requesting device 320 according to at least some embodiments. As shown in FIG. 12, the device includes one or more processing circuits 1220, memory 1240, transmitter circuits 1120 and receiver circuits 1280. The one or more processing circuits control the operation of the device to perform functionality described above, e.g., via the transmitter and receiver circuits.

The circuits described above may comprise one or more processors, hardware circuits, firmware or a combination thereof. The device in this regard may comprise memory that includes one or more volatile and/or non-volatile memory devices. Program code for controlling operation of the device may be stored in a non-volatile memory, such as read-only memory or flash memory. Temporary data generated during operation may be stored in random access memory. Program code stored in memory, when executed by the processing circuit(s), causes the processing circuit(s) to perform the methods shown above.

Embodiments herein thereby further include a computer program comprising instructions, which when executed on at least one processor of a device, cause the device to carry out the method(s) above. Embodiments further include a carrier containing such a computer program, where the carrier is one of an electrical signal, an optical signal, a radio signal, or a computer readable storage medium.

Embodiments of course also include a system that includes the devices described herein.

What is claimed is:

1. A method implemented by an advertising device in a wireless communication network, the method comprising:
   transmitting an advertisement message from the advertising device over a first channel, wherein the advertisement message advertises that the advertising device is available to connect with one or more other devices in the wireless communication network; and
   after transmitting the advertisement message, receiving at the advertising device a connection request message from a requesting device in the wireless communication network over a second channel different than the first channel, wherein the connection request message requests the advertising device to connect with the requesting device in response to the advertisement message; and
   wherein the first channel is a random access channel of an advertising type, and the second channel is a scheduled channel of a data type.

2. The method of claim 1, further comprising dynamically selecting the second channel, from among multiple different candidate channels, as being the channel over which the connection request message is to be received, and transmitting information indicating said selection.

3. The method of claim 2, wherein said dynamically selecting comprises dynamically selecting the second channel based on measurements or estimates of interference on the different candidate channels.

4. The method of claim 2, wherein transmitting said information comprises transmitting said information within the advertisement message.

5. The method of claim 1, further comprising receiving the connection request message over the second channel if a previous transmission of the connection request message is not received over the first channel or is not successfully acknowledged to the requesting device, or both.

6. The method of claim 1, further comprising dynamically selecting, from among multiple different candidate channels including the first channel and the second channel, a channel over which the connection request message is to be received, and wherein said receiving comprises receiving the connection request message over the second channel when the second channel is dynamically selected and receiving the connection request message over the first channel when the first channel is dynamically selected.

7. The method of claim 1, wherein the first channel is a contention-based channel with respect to any other advertisement messages transmitted during the transmission of the advertisement message, and the second channel minimizes contention from any advertisement messages transmitted during the transmission of the connection-request message.

8. The method of claim 1, wherein the scheduled channel is a dedicated channel.

9. The method of claim 1, further comprising identifying the second channel as being the channel over which the connection request message is to be transmitted, based on a defined mapping from the first channel to the second channel.

10. The method of claim 9, wherein the defined mapping maps different candidate advertisement channels to different candidate connection request channels with a one-to-one correspondence.

11. The method of claim 9, wherein the defined mapping maps a given candidate advertisement channel to a candidate connection request channel that has the minimum frequency distance from the given candidate advertisement channel.

12. The method of claim 1, further comprising configuring the second channel as being the channel over which the connection request message is to be received via radio resource control signaling.

13. The method of claim 1, wherein said advertisement message comprises configuration information indicating the second channel.

14. The method of claim 1, further comprising, during a previous connection between the advertising and requesting devices, configuring the second channel as being the channel over which the connection request message is to be received.

15. The method of claim 1, wherein the connection request message includes connection setup parameters for data exchange between the advertising and requesting devices.

16. The method of claim 1, wherein the wireless communication network is one of a personal area network, a local area network, or a Bluetooth network.

17. The method of claim 1, wherein the wireless communication network is a Bluetooth Low Energy network supporting a long range physical layer.

18. The method of claim 1, wherein the advertising device is a peripheral device and the requesting device is a central device.

19. A method implemented by a requesting device for requesting an advertising device to connect to the requesting device in a wireless communication network, the method comprising:
- receiving, at the requesting device, an advertisement message from the advertising device over a first channel, wherein the advertisement message advertises that the advertising device is available to connect with one or more other devices in the wireless communication network; and
- responsive to the advertisement message, transmitting a connection request message from the requesting device to the advertising device over a second channel different than the first channel, wherein the connection request message requests the advertising device to connect with the requesting device; and
- wherein the first channel is a random access channel of an advertising type, and the second channel is a scheduled channel of a data type.

20. The method of claim 19, further comprising receiving information from the advertising device indicating the advertising device's dynamic selection of the second channel as being the channel over which connection request messages responsive to the advertisement message are to be received.

21. The method of claim 20, wherein said receiving comprises retrieving the information from within the advertisement message.

22. The method of claim 19, further comprising, before transmitting the connection request message over the second channel, transmitting the connection request message over the first channel and monitoring for an acknowledgement of the connection request message from the advertising device, and wherein transmitting the connection request message over the second channel comprises re-transmitting the connection request message over the second channel if according to said monitoring the advertising device does not acknowledge the connection request message as transmitted over the first channel.

23. The method of claim 19, wherein said transmitting comprises transmitting the connection request message over the second channel responsive to determining that the second channel was dynamically selected by the advertising device as being the channel over which the connection request message is to be transmitted, and transmitting the connection request message over the first channel responsive to determining that the first channel was dynamically selected by the advertising device as being the channel over which the connection request message is to be transmitted.

24. The method of claim 19, wherein the first channel is a contention-based channel with respect to any other advertisement messages transmitted during the transmission of the advertisement message, and the second channel minimizes contention from any advertisement messages transmitted during the transmission of the connection-request message.

25. The method of claim 19, wherein the scheduled channel is a dedicated channel.

26. The method of claim 19, further comprising identifying the second channel as being the channel over which the connection request message is to be transmitted, based on a defined mapping from the first channel to the second channel.

27. The method of claim 26, wherein the defined mapping maps different candidate advertisement channels to different candidate connection request channels with a one-to-one correspondence.

28. The method of claim 26, wherein the defined mapping maps a given candidate advertisement channel to a candidate connection request channel that has the minimum frequency distance from the given candidate advertisement channel.

29. The method of claim 19, further comprising configuring the second channel as being the channel over which the connection request message is to be received via radio resource control signaling.

30. The method of claim 19, wherein said advertisement message comprises configuration information indicating the second channel.

31. The method of claim 19, further comprising, during a previous connection between the advertising and requesting devices, configuring the second channel as being the channel over which the connection request message is to be received.

32. The method of claim 19, wherein the connection request message includes connection setup parameters for data exchange between the advertising and requesting devices.

33. The method of claim 19, wherein the wireless communication network is one of a personal area network, a local area network, or a Bluetooth network.

34. The method of claim 19, wherein the wireless communication network is a Bluetooth Low Energy network supporting a long range physical layer.

35. The method of claim 19, wherein the advertising device is a peripheral device and the requesting device is a central device.

36. An advertising device in a wireless communication network, the advertising device comprising:
- one or more processing circuits; and
- memory, the memory containing instructions executable by the one or more processing circuits to configure the advertising device to:
  - transmit an advertisement message from the advertising device over a first channel, wherein the advertisement message advertises that the advertising device is available to connect with one or more other devices in the wireless communication network; and
  - after transmitting the advertisement message, receive a connection request message from a requesting device in the wireless communication network over a second channel different than the first channel, wherein the connection request message requests the advertising device to connect with the requesting device in response to the advertisement message; and
- wherein the first channel is a random access channel of an advertising type, and the second channel is a scheduled channel of a data type.

37. The advertising device of claim 36, wherein the memory contains instructions executable by the one or more processing circuits to configure the advertising device to:
- dynamically select the second channel, from among multiple different candidate channels, as being the channel over which the connection request message is to be received; and
- transmit information indicating said selection.

38. The advertising device of claim 36, wherein the first channel is a contention-based channel with respect to any other advertisement messages transmitted during the transmission of the advertisement message, and the second channel minimizes contention from any advertisement messages transmitted during the transmission of the connection-request message.

39. A requesting device configured to request an advertising device to connect to the requesting device in a wireless communication network, the requesting device comprising:

one or more processing circuits; and memory, the memory containing instructions executable by the one or more processing circuits to configure the advertising device to:

receive an advertisement message from the advertising device over a first channel, wherein the advertisement message advertises that the advertising device is available to connect with one or more other devices in the wireless communication network; and responsive to the advertising message, transmit a connection request message from the requesting device to the advertising device over a second channel different than the first channel, wherein the connection request message requests the advertising device to connect with the requesting device; and wherein the first channel is a random access channel of an advertising type, and the second channel is a scheduled channel of a data type.

40. The requesting device of claim 39, wherein the memory contains instructions executable by the one or more processing circuits to configure the requesting device to:

receive information from the advertising device indicating the advertising device's dynamic selection of the second channel as being the channel over which connection request messages responsive to the advertisement message are to be received.

41. The requesting device of claim 39, wherein the first channel is a contention-based channel with respect to any other advertisement messages transmitted during the transmission of the advertisement message, and the second channel minimizes contention from any advertisement messages transmitted during the transmission of the connection-request message.

42. A non-transitory computer readable medium for controlling an advertising device in a wireless communication network, the non-transitory computer readable medium having stored thereon software instructions which, when run on one or more processing circuits of the advertising device, causes the advertising device to:

transmit an advertisement message over a first channel, wherein the advertisement message advertises that the advertising device is available to connect with one or more other devices in the wireless communication network; and after transmitting the advertisement message, receive a connection request message from a requesting device in the wireless communication network over a second channel different than the first channel, wherein the connection request message requests the advertising device to connect with the requesting device in response to the advertisement message and wherein the first channel is a random access channel of an advertising type, and the second channel is a scheduled channel of a data type.

43. A non-transitory computer readable medium for requesting an advertising device to connect to a requesting device in a wireless communication network, the non-transitory computer readable medium having stored thereon software instructions which, when run on one or more processing circuits of the requesting device, causes the requesting device to:

receive an advertisement message from the advertising device over a first channel, wherein the advertisement message advertises that the advertising device is available to connect with one or more other devices in the wireless communication network; and responsive to the advertising message, transmit a connection request message to the advertising device over a second channel different than the first channel, wherein the connection request message requests the advertising device to connect with the requesting device; and wherein the first channel is a random access channel of an advertising type, and the second channel is a scheduled channel of a data type.

* * * * *